H. J. GREEN.
BLOWING TOY.
No. 185,025.  Patented Dec. 5, 1876.
Fig: 1.
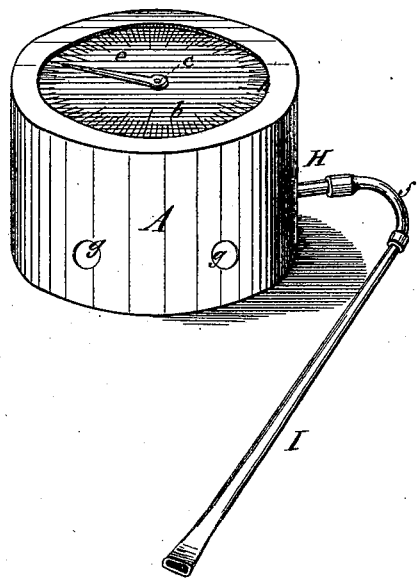
Fig: 2.
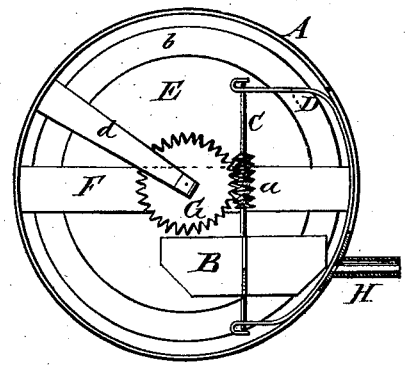

UNITED STATES PATENT OFFICE.

HENRY J. GREEN, OF NEW YORK, N. Y., ASSIGNOR TO HENRY SHAFFER, OF SAME PLACE.

IMPROVEMENT IN BLOWING-TOYS.

Specification forming part of Letters Patent No. 185,025, dated December 5, 1876; application filed October 23, 1876.

*To all whom it may concern:*

Be it known that I, HENRY J. GREEN, of the city, county, and State of New York, have invented a new and Improved Toy Lung-Tester, of which the following is a specification:

Figure 1 is a perspective view. Fig. 2 is a bottom view.

Similar letters of reference indicate corresponding parts.

My invention consists in the combination of a fan-wheel and worm-gear for reducing the motion of the said fan, and an index and graduated dial for indicating the motion of the fan; the object being to provide a compact and inexpensive instrument for indicating the capacity of the lungs by the number of revolutions made by the fan-wheel when propelled by a single expiration from the lungs.

In the drawing, A is the casing of the instrument, which may be made from tin or other suitable material. B is a fan-wheel, secured to a shaft, C, having pointed ends, and provided with the worm or endless screw $a$. D is a strip of metal, that is attached to the side of the casing A, and is bent and provided with holes for receiving the ends of the shaft C, and is bent over or returned upon itself, forming a bearing for the pointed ends of the shaft. E is a plate, upon which the dial $b$ is placed, which is attached to a cross-bar, F, that is attached to the sides of the casing A. G is a wheel, with which the worm $a$ engages, which is secured to a shaft, $c$, arranged centrally in the casing A. The lower end of this shaft has its bearing in an arm, $d$, attached to the side of the casing, and its upper end projects through the cross-bar F and dial, and rests against the glass covering $h$ of the dial $b$. An index, $e$, is placed on the shaft $c$, between the dial $b$ and the glass $h$. The dial is graduated in any desirable manner. H is a tube, that passes through the casing A, and directs a current of air on the fan-wheel B, tangentially. I is a glass mouth-tube, which is connected with the tube H by means of the flexible rubber tube $f$. Perforations $g$ are made in the sides and bottom of the casing, to permit the free escape of the air blown in through the tube H for propelling the fan-wheel. To test the capacity of the lungs a full breath is taken in and blown through the tube H, and the index $e$ indicates the number of revolutions made by the fan.

The instrument is not only an interesting and amusing toy, but it also serves the useful purpose of expanding and developing the lungs.

Having thus described my invention, I claim as new and desire to secure by Letters Patent—

The combination of the fan-wheel B, worm-gear $a$ G, index $e$, dial $b$, casing A, having a glass cover, and the tube H, substantially as and for the purpose shown and described.

HENRY J. GREEN.

Witnesses:
 C. SEDGWICK,
 GEO. M. HOPKINS.